(12) United States Patent
Liu et al.

(10) Patent No.: US 11,620,515 B2
(45) Date of Patent: Apr. 4, 2023

(54) MULTI-TASK KNOWLEDGE DISTILLATION FOR LANGUAGE MODEL

(71) Applicant: salesforce.com, inc., San Francisco, CA (US)

(72) Inventors: Linqing Liu, Menlo Park, CA (US); Caiming Xiong, Menlo Park, CA (US)

(73) Assignee: salesforce.com, inc., San Francisco, CA (US)

( * ) Notice: Subject to any disclaimer, the term of this patent is extended or adjusted under 35 U.S.C. 154(b) by 643 days.

(21) Appl. No.: 16/716,249

(22) Filed: Dec. 16, 2019

(65) Prior Publication Data

US 2021/0142164 A1 May 13, 2021

Related U.S. Application Data

(60) Provisional application No. 62/932,163, filed on Nov. 7, 2019.

(51) Int. Cl.
*G06N 3/08* (2006.01)
*G06F 40/40* (2020.01)
*G06F 40/30* (2020.01)
*G06N 3/04* (2006.01)

(52) U.S. Cl.
CPC .............. *G06N 3/08* (2013.01); *G06F 40/30* (2020.01); *G06F 40/40* (2020.01); *G06N 3/0454* (2013.01)

(58) Field of Classification Search
CPC ...... G06N 3/08; G06N 3/0454; G06N 3/0445; G06N 3/0472; G06N 3/0481; G06F 40/30; G06F 40/40; G06F 40/216; G06F 40/284; G06F 40/289
See application file for complete search history.

(56) References Cited

U.S. PATENT DOCUMENTS

| | | | |
|---|---|---|---|
| 10,282,663 | B2 | 5/2019 | Socher et al. |
| 10,346,721 | B2 | 7/2019 | Albright et al. |
| 10,474,709 | B2 | 11/2019 | Paulus |
| 2016/0350653 | A1 | 12/2016 | Socher et al. |
| 2017/0024645 | A1 | 1/2017 | Socher et al. |

(Continued)

OTHER PUBLICATIONS

Ba et al., "Do Deep Nets Really Need to be Deep?" in Advances in Neural Information Processing Systems, pp. 1-9, 2014.

(Continued)

*Primary Examiner* — Daniel C Washburn
*Assistant Examiner* — Athar N Pasha
(74) *Attorney, Agent, or Firm* — Haynes and Boone LLP (57) ABSTRACT

Systems and methods are provided that employ knowledge distillation under a multi-task learning setting. In some embodiments, the systems and methods are implemented with a larger teacher model and a smaller student model, each of which comprise one or more shared layers and a plurality of task layers for performing multiple tasks. During training of the teacher model, its shared layers are initialized, and then the teacher model is multi-task refined. The teacher model predicts teacher logits. During training of the student model, its shared layers are initialized. Knowledge distillation is employed to transfer knowledge from the teacher model to the student model by the student model updating its shared layers and task layers, for example, according to the teacher logits of the teacher model. Other features are also provided.

21 Claims, 8 Drawing Sheets

(56) References Cited

U.S. PATENT DOCUMENTS

| | | |
|---|---|---|
| 2017/0032280 A1 | 2/2017 | Socher |
| 2017/0140240 A1 | 5/2017 | Socher |
| 2018/0082171 A1 | 3/2018 | Merity et al. |
| 2018/0096219 A1 | 4/2018 | Socher |
| 2018/0121787 A1 | 5/2018 | Hashimoto et al. |
| 2018/0121788 A1 | 5/2018 | Hashimoto et al. |
| 2018/0121799 A1 | 5/2018 | Hashimoto et al. |
| 2018/0129931 A1 | 5/2018 | Bradbury et al. |
| 2018/0129937 A1 | 5/2018 | Bradbury et al. |
| 2018/0129938 A1 | 5/2018 | Xiong et al. |
| 2018/0143966 A1 | 5/2018 | Lu et al. |
| 2018/0144208 A1 | 5/2018 | Lu et al. |
| 2018/0144248 A1 | 5/2018 | Lu et al. |
| 2018/0268287 A1 | 9/2018 | Johansen et al. |
| 2018/0268298 A1 | 9/2018 | Johansen et al. |
| 2018/0300317 A1 | 10/2018 | Bradbury |
| 2018/0336198 A1 | 11/2018 | Zhong et al. |
| 2018/0336453 A1 | 11/2018 | Merity et al. |
| 2018/0349359 A1 | 12/2018 | McCann et al. |
| 2018/0373682 A1 | 12/2018 | McCann et al. |
| 2018/0373987 A1 | 12/2018 | Zhang et al. |
| 2019/0130206 A1 | 5/2019 | Trott et al. |
| 2019/0130248 A1 | 5/2019 | Zhong et al. |
| 2019/0130249 A1 | 5/2019 | Bradbury et al. |
| 2019/0130273 A1 | 5/2019 | Keskar et al. |
| 2019/0130312 A1 | 5/2019 | Xiong et al. |
| 2019/0130896 A1 | 5/2019 | Zhou et al. |
| 2019/0130897 A1 | 5/2019 | Zhou et al. |
| 2019/0149834 A1 | 5/2019 | Zhou et al. |
| 2019/0156106 A1* | 5/2019 | Schroff ................. G06V 10/82 |
| 2019/0188568 A1 | 6/2019 | Keskar et al. |
| 2019/0213482 A1 | 7/2019 | Socher et al. |
| 2019/0251168 A1 | 8/2019 | McCann et al. |
| 2019/0251431 A1 | 8/2019 | Keskar et al. |
| 2019/0258714 A1 | 8/2019 | Zhong et al. |
| 2019/0258901 A1 | 8/2019 | Albright et al. |
| 2019/0258939 A1 | 8/2019 | Min et al. |
| 2019/0286073 A1 | 9/2019 | Hosseini-Asl et al. |
| 2019/0295530 A1 | 9/2019 | Hosseini-Asl et al. |
| 2019/0311002 A1 | 10/2019 | Paulus |
| 2019/0355366 A1* | 11/2019 | Ng ....................... G06N 3/0454 |
| 2019/0362020 A1 | 11/2019 | Paulus et al. |
| 2019/0362246 A1 | 11/2019 | Lin et al. |
| 2020/0097850 A1* | 3/2020 | Bae ........................ G06N 20/20 |
| 2020/0134506 A1* | 4/2020 | Wang ..................... G06N 3/084 |
| 2020/0334520 A1* | 10/2020 | Chen ...................... G06N 3/088 |

OTHER PUBLICATIONS

Baxter, "A Model of Inductive Bias Learning," Journal of Artificial Intelligence Research, 12:149-198, 2000.

Bojanowski et al., "Enriching Word Vectors with Subword Information," Transactions of the Association for Computational Linguistics, 5(1): 135-146, 2017.

Caruana, "Multitask Learning," Machine learning, 28(1):41-75, 1997.

Cer et al., "Semeval-2017 Task 1: Semantic Textual Similarity-Multilingual and Cross-Lingual Focused Evaluation," arXiv:1708.00055, pp. 1-14, 2017.

Clark et al., "Bam! Born-Again Multi-Task Networks for Natural Language Understanding," arXiv:1907.04829, pp. 1-7, 2019.

Collobert et al., "A Unified Architecture for Natural Language Processing: Deep Neural Networks with Multi Task Learning," in Proceedings of the 25th International Conference on Machine Learning, pp. 160-167, ACM, 2008.

Dai et al., "Semi-Supervised Sequence Learning," in Advances in Neural Information Processing Systems, pp. 3079-3087, 2015.

Deng et al., "New Types or Deep Neural Network Learning for Speech Recognition and Related Applications: An Overview," in 2013 IEEE International Conference on Acoustics, Speech and Signal Processing, pp. 8599-8603, IEEE, 2013.

Devlin et al., "BERT: Pre-training of Deep Bidirectional Transformers for Language Understanding," Proceedings of NAACL-HLT 2019, pp. 4171-4186, Minneapolis, Minnesota, Jun. 2-Jun. 7, 2019.

Dolan et al., "Automatically Constructing a Corpus of Sentential Paraphrases," in Proceedings of the Third International Workshop on Paraphrasing (IWP2005), pp. 1-8, 2005.

Girshick, "Fast R-CNN," in Proceedings, of the IEEE International Conference on Computer Vision, pp. 1440-1448, 2015.

Hinton et al.,"Distilling the Knowledge in a Neural Network," arXiv:1503.02531, pp. 1-9, 2015.

Howard et al., "Universal Language Model Fine-Tuning for Text Classification," in Proceedings of the 56th Annual Meeting of the Association for Computational Linguistics, (vol. 1: Long Papers), pp. 328-339, 2018.

Jiao et al., "Tinybert: Distilling BERT for Natural Language Understanding," arXiv:1909.10351, pp. 1-13, 2019.

Kingma et al., "Adam: A Method for Stochastic Optimization," in International Conference on Learning Representations, (ICLR), pp. 1-15, 2015.

Lan et al., "ALBERT: A Lite BERT for Self-Supervised Learning of Language Representations," arXiv:1909 11942, pp. 1-16, 2019.

Li et al., "Efficient Mini-Batch Training for Stochastic Optimization," in Proceedings of the 20th ACM SIGKDD International Conference on Knowledge Discovery and Data Mining, pp. 661-670, ACM, 2014.

Liu et al., "Representation Learning using Multi-Task Deep Neural Networks for Semantic Classification and Information Retrieval," in Proceedings of the 2015 Conference of the North American Chapter 4 the Association for Computational Linguistics: Human Language Technologies, pp. 912-921, 2015.

Liu et al., "Improving Multi-Task Deep Neural Networks via Knowledge Distillation for Natural Language Understanding," arXiv:1904.09482, pp. 1-8, 2019.

Liu et al., "Multi-Task Deep Neural Networks for Natural Language Understanding," arXiv:1901.11504, pp. 1-10, 2019.

Liu et al., "RoBERTa: A Robustly Optimized BERT Pretraining Approach," arXiv:1907.11692, pp. 1-13, 2019.

Maurer et al., "The Benefit of Multitask Representation Learning," The Journal of Machine Learning Research, 17(1):2853-2884, 2016.

McCann et al., "Learned in Translation: Contextualized Word Vectors," 31st Conference on Neural Information Processing Systems (NIPS 2017), Long Beach, CA, USA, pp. 6294-6305.

Melamud et al., "conlext2vec: Learning Generic Context Embedding with Bidirectional LSTM," in Proceedings of the 20th SIGNLL Conference on Computational Natural Language Learning, pp. 51-61, 2016.

Mikolov et al., "Efficient Estimation of Word Representations in VectorSpace," arXiv:1301.3781, pp. 1-12, 2013.

Nair et al., "Rectified Linear Units Improve Restricted Boltzmann Machines, in Proceedings of the 27th International Conference on Machine Learning," (ICML-10), pp. 807-814, 2010.

Neelakantan et al., "Efficient Non-Parametric Estimation of Multiple Embeddings per Word in Vector Space," arXiv:1504.06654, pp. 1-12, 2015.

Pennington et al., "GloVe: Global Vectors for Word Representation", Proceedings of the 2014 Conference on Empirical Methods in Natural Language Processing (EMNLP), Doha, Qatar, Oct. 25-29, 2014, https://nlp.Stanford.edu/pubs/glove.pdf. pp. 1532-1543, pp. 1-12.

Peters et al, "Deep Contextualized Word Representations," Proceedings of NAACL-HLT 2018, pp. 2227-2237 New Orleans, Louisiana, Jun. 1-6, 2018.

Radford et al., "Improving Language Understanding by Generative Pre-Training," URL https://s3-us-west-2.amazonaws.com/openai-assets/research-covers/language-unsupervised/language_understanding_paper.pdf, pp. 1-12, 2018.

Radford et al., "Language Models are Unsupervised Multitask Learners," pp. 1-24, 2019.

Rajpurkar et al., "Squad: 100,000+ Questions for Machine Comprehension of Text," in Proceedings of the 2016 Conference on Empirical Methods in Natural Language Processing, pp. 2383-2392, 2016.

Seo et al., "Bi-Directional Attention Flow for Machine Comprehension," arXiv:1611.01603, pp. 1-12, 2016.

(56) References Cited

OTHER PUBLICATIONS

Socher et al., "Recursive Deep Models for Semantic Constitutionality over a Sentiment Tree-Bank," in Proceedings of the 2013 Conference on Empirical Methods in Natural Language Processing, pp. 1631-1642, 2013.
Sun et al., "Patient knowledge distillation for BERT Model Compression," arXiv:1908.09355, pp. 1-10, 2019.
Tang et al., "Distilling Task Specific Knowledge from BERT into Simple Neural Networks," arXiv:1903.12136, pp. 1-8, 2019.
Turian et al., "Word Representations: A Simple and General Method for Semi-Supervised Learning," in Proceedings of the 48th Annual Meeting of the Association for Computational Linguistics, pp. 384-394, Uppsala, Sweden, Jul. 11-16, 2010, Association for Computational Linguistics, 2010.
Wang et al., "GLUE: A Multi-Task Benchmark and Analysis Platform for Natural Language Understanding," in Proceedings of the 2018 EMNLP Workshop BlackboxNLP: Analyzing and interpreting Neural Networks for NLP, pp. 353-355, Brussels, Belgium, Nov. 1, 2018.
Williams et al., "A Broad-coverage Challenge Corpus for Sentence Understanding through Inference," in Proceedings of NAACL-HLT 2018, pp. 1112-1122, New Orleans, Louisiana, Jun. 1-6, 2018.
Wu et al., "Google's Neural Machine Translation System: Bridging the Gap between Human and Machine Translation," arXiv:1609.08144, pp. 1-23, 2016.
Xiong et al., "Dynamic Coattention Networks for Question Answering," arXiv:1611.01604, pp. 1-13, 2016.
Yang et al., "XLNet: Generalized Autoregressive Pretraining for Language Understanding," arXiv:1906.08237, pp. 1-18, 2019.
Zhao et al., "Extreme Language Model Compression with Optimal Subwords and Shared Projections," arXiv:1909.11687, pp. 1-11, 2019.

* cited by examiner

| Multi-task Distillation |
|---|
| Initialize the shared layers with $BERT_{Large}$ then multi-task refine the teacher model |
| Randomly initialize the student model parameters |
| Set the max number of epoch: $epoch_{max}$ |
| // Pack the data for T Tasks into batches |
| for $t \leftarrow 1$ to $T$ do |
|     1. Generate augmented data: $t_{aug}$ |
|     2. Pack the dataset $t$ and $t_{aug}$ into batch $D_t$ |
| end for |
| // Train the student model |
| for $epoch \leftarrow 1$ to $epoch_{max}$ do |
|     1. Merge all datasets: |
|         $D = D_1 \cup D_2 ... \cup D_T$ |
|     2. Shuffle D |
|     for $b_t$ in D do |
|         3. Predict logits $z^T$ from teacher model |
|         4. Predict logits $z^S$ from student model |
|         5. Compute loss $L_{distill}(\theta)$ |
|         6. Update student model: |
|             $\theta = \theta - \alpha \nabla_\theta L_{distill}$ |
|     end for |
| end for |

*FIG. 6*

| Model | SST-2 | MRPC | STS-B | QQP | MNLI-m/mm | QNLI | RTE |
|---|---|---|---|---|---|---|---|
| | Acc | $F_1$/Acc | r/ρ | $F_1$/Acc | Acc | Acc | Acc |
| $BERT_{LARGE}$ | 94.9 | 89.3/85.4 | 87.6/86.5 | 72.1/89.3 | 86.7/85.9 | 92.7 | 70.1 |
| $BERT_{BASE}$ | 93.5 | 88.9/84.8 | 87.1/85.8 | 71.2/89.2 | 84.6/83.4 | 90.5 | 66.4 |
| OpenAI GPT | 91.3 | 82.3/75.7 | 82.0/80.0 | 70.3/88.5 | 82.1/81.4 | - | 56.0 |
| ELMo | 90.4 | 84.4/78.0 | 74.2/72.3 | 63.1/84.3 | 74.1/74.5 | 79.8 | 58.9 |
| $ALBERT_{1.5M}$ | 96.9 | 90.9/- | 93.0/- | 92.2/- | 90.8/- | 95.3 | 89.2 |
| $ALBERT_{ensembles}$ | 97.1 | 93.4/91.2 | 92.5/92.0 | 74.2/90.5 | 91.3/91.0 | 99.2 | 89.2 |
| MT-DNN | 94.6 | 90.1/86.4 | 89.5/88.8 | 72.2/89.6 | 86.5/85.8 | 93.1 | 79.1 |
| $MT-DNN_{Teacher}$ | 94.7 | 84.7/79.7 | 84.0/83.3 | 72.3/89.6 | 85.9/85.7 | 90.5 | 77.7 |
| Distilled BiLSTM | 91.6 | 82.7/75.6 | 79.6/78.2 | 68.5/88.4 | 72.5/72.4 | - | - |
| $BERT_6$-PKD | 92.0 | 85.0/79.9 | - | 70.7/88.9 | 81.5/81.0 | 89.0 | 65.5 |
| $BERT_3$-PKD | 87.5 | 80.7/72.5 | - | 68.1/87.8 | 76.7/76.3 | 84.7 | 58.2 |
| TinyBERT | 92.6 | 86.4/81.2 | 81.2/79.9 | 71.3/89.2 | 82.5/81.8 | 87.7 | 62.9 |
| $BERT_{EXTREME}$ | 88.4 | 84.9/78.5 | - | - | 78.2/77.7 | - | - |
| $BNN_{MTL}$ | 90.0 | 84.2/78.7 | 78.6/78.6 | 69.6/88.0 | 78.5/77.9 | 83.3 | 67.6 |
| BNN | 91.0 | 85.4/79.7 | 80.9/80.9 | 70.7/88.6 | 78.6/78.4 | 85.4 | 67.3 |

FIG. 7A

| # | Model | SST-2 | MRPC | STS-B | QQP | MNLI-m/mm | QNLI | RTE |
|---|---|---|---|---|---|---|---|---|
| 1 | $BNN_{MTL}$ -KD | 85.8 | 80.4/69.9 | 12.24/11.33 | 81.1/86.5 | 73.0/73.7 | 80.3 | 53.1 |
| 2 | $BNN_{MTL}$ -MTL KD -AugData | 89.2 | 82.5/72.1 | 20.2/20.0 | 84.6/88.4 | 74.7/75.0 | 82.0 | 52.0 |
| 3 | $BNN_{MTL}$ -AugData | 89.5 | 86.4/78.9 | 81.3/81.4 | 84.3/88.5 | 76.9/77.8 | 82.8 | 67.9 |
| 4 | $BNN_{MTL}$ -WordPiece -AugData | 87.3 | 84.2/75.7 | 72.2/72.6 | 71.1/79.3 | 69.4/70.9 | 75.1 | 54.9 |
| 5 | $BiLSTM_{MTL}$ -AugData | 87.5 | 83.2/72.8 | 71.6/72.6 | 81.6/87.0 | 70.2/71.3 | 75.4 | 56.3 |
| 6 | $BNN_{MTL}$ | 89.3 | 86.8/81.1 | 84.5/84.5 | 85.2/89.0 | 78.4/79.2 | 83.0 | 67.9 |

FIG. 7B

| Model | SST-2 | MRPC | STS-B | QQP | MNLI-m/mm | QNLI | RTE |
|---|---|---|---|---|---|---|---|
| Sentiment Task | ✓ | | | | | | |
| BNN | 89.9 | 81.4/70.8 | 51.2/49.9 | 84.9/88.3 | 74.3/74.7 | 83.2 | 50.9 |
| PI Tasks | | ✓ | | ✓ | | | |
| BNN | 89.3 | 85.2/77.2 | 83.4/83.3 | 84.9/88.7 | 73.2/73.9 | 83.8 | 59.6 |
| NLI Tasks | | | | | ✓ | ✓ | ✓ |
| BNN | 90.4 | 87.9/82.1 | 84.1/84.1 | 84.8/88.4 | 77.1/78.1 | 84.5 | 66.8 |
| All Tasks | ✓ | ✓ | ✓ | ✓ | ✓ | ✓ | ✓ |
| BNN | 90.5 | 86.9/80.2 | 85.0/84.8 | 84.8/89.0 | 77.4/78.3 | 84.9 | 68.2 |

FIG. 7C

| | Distilled BiLSTM | BERT-PKD | TinyBERT | BNN |
|---|---|---|---|---|
| Inference Time | 1.36 | 63.7 | 19.9 | 2.93 |
| Model Size | 1.59 | 28.8 | 5.0 | 10.2 |

FIG. 7D

MULTI-TASK KNOWLEDGE DISTILLATION FOR LANGUAGE MODEL

RELATED APPLICATIONS

This application claims priority to U.S. Provisional Patent Application No. 62/932,163, filed Nov. 7, 2019, which is incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to machine learning models and neural networks, and more specifically, to multi-task language distillation for language model.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Artificial intelligence, implemented with neural networks and deep learning models, has demonstrated great promise as a technique for automatically analyzing real-world information with human-like accuracy. In general, such neural network and deep learning models receive input information and make predictions based on the same. Whereas other approaches to analyzing real-world information may involve hard-coded processes, statistical analysis, and/or the like, neural networks learn to make predictions gradually, by a process of trial and error, using a machine learning process. A given neural network model may be trained using a large number of training examples, proceeding iteratively until the neural network model begins to consistently make similar inferences from the training examples that a human might make. Neural network models have been shown to outperform and/or have the potential to outperform other computing techniques in a number of applications.

Natural language processing (NLP) is one class of problems to which neural networks may be applied. NLP tasks include natural language inference, sentiment classification, and semantic textual similarity. Pre-trained language models learn highly effective general language representations from large scale unlabeled data. However, such models typically use dozens, if not hundreds, of millions of parameters, invariably leading to resource-intensive inference.

BRIEF DESCRIPTION OF THE DRAWINGS

FIGS. 7A-7D illustrate example results of the multi-task language model distillation framework or architecture, according to some embodiments.

In the figures, elements having the same designations have the same or similar functions.

DETAILED DESCRIPTION

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Overview

Artificial intelligence, implemented with neural networks and deep learning models, has demonstrated great promise as a technique for automatically analyzing real-world information with human-like accuracy. In general, such neural network and deep learning models receive input information and make predictions based on the input information.

Natural language processing (NLP) is one class of problems to which neural networks may be applied. NLP tasks include natural language inference, sentiment classification, and semantic textual similarity. Pre-trained language models learn highly effective general language representations from large scale unlabeled data. However, such models typically use dozens, if not hundreds, of millions of parameters, invariably leading to resource-intensive inference. Accordingly, it is desirable to reduce the model size and the associated computational cost while maintaining comparable quality of output for such language models.

According to some embodiments, the present disclosure provides systems and methods that employ knowledge distillation under a multi-task learning setting. In some embodiments, the systems and methods are implemented with a larger teacher model and a smaller student model, each of which comprise one or more shared layers and a plurality of task layers for performing multiple tasks. During training of the teacher model, its shared layers are initialized, and then the teacher model is multi-task refined. The teacher model predicts teacher logits. During training of the student model, its shared layers are initialized. Knowledge distillation is employed to transfer knowledge from the teacher model to the student model by the student model updating its shared layers and task layers, for example, according to the teacher logits of the teacher model.

In some embodiments, the systems and methods may be implemented with or adopt a language representational model, such as a Bidirectional Encoder Representations from Transformers (BERT) model, as described in more detail in Devlin et al., "BERT: Pre-training of Deep Bidirectional Transformers for Language Understanding," *In Proceedings of the* 2019 *Conference of the North American Chapter of the Association for Computational Linguistics: Human Language Technologies, Volume* 1 (*Long and Short Papers*), pages 4171-4186, which is incorporated by reference herein. In some embodiments, the BERT model is distilled, refined by multitask learning, into a bidirectional long short-term memory (BiLSTM) model with attention mechanism (simplified biattentive classification network). Unlike other methods or techniques which specifically designed for transformer-based architectures, the systems and methods implement a general learning framework or approach. This approach is model-agnostic and can be readily applied on different future teacher models. The distilled model of the present disclosure outperforms a single BiLSTM in student model. It also achieves comparable results with faster inference speed while maintaining comparable performances.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Computing Device

According to some embodiments, the systems of the present disclosure—including the various networks, models, and modules—can be implemented in one or more computing devices.

Figure 1:
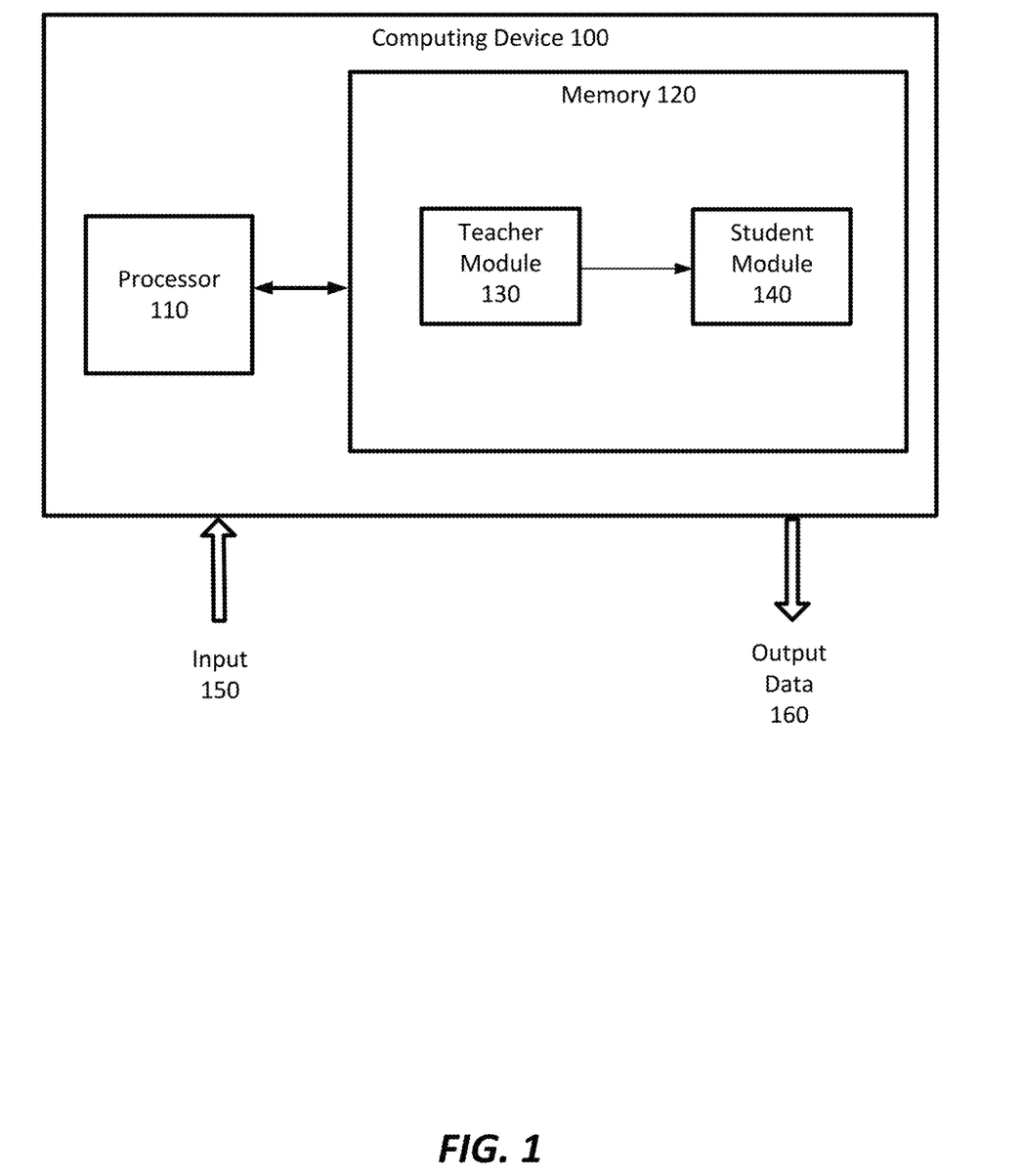
FIG. 1 is a simplified diagram of a computing device according to some embodiments.

FIG. 1 is a simplified diagram of a computing device 100 according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

As shown, memory 120 includes a teacher module 130 and a student module 140 that may be used, either separately or together, to implement and/or emulate the neural network systems and models described further herein and/or to implement any of the methods described further herein. In some examples, memory 120 may include non-transitory, tangible, machine readable media that includes executable code that when run by one or more processors (e.g., processor 110) may cause the one or more processors to perform the methods described in further detail herein. In some examples, the teacher module 130 and student module 140 may be implemented using hardware, software, and/or a combination of hardware and software. As shown, computing device 100 receives input 150, which is provided to teacher module 130 and/or student module 140, which then generates output 160.

According to some embodiments, computing device 100 implements an architecture or framework that employs knowledge distillation for a language model under a multi-task learning setting. In some embodiments, in this framework, teacher module 130 may be pre-trained and/or used for natural language processing (NLP), including for such tasks as natural language inference, single sentence classification, sentiment classification, semantic textual similarity, and relevance ranking. In some embodiments, the teacher module 130 implements a neural network model that is relatively large in size and parameters used—e.g., the teacher model may use dozens, if not hundreds, of millions of parameters, which is resource-intensive. The student module 140—which, in some examples, may also be used for NLP—implements a neural network model that is a smaller compared to the teacher model. The knowledge learned by teacher module 130 may be transferred (knowledge distillation) to the smaller student module 140, under the multi-task learning setting or architecture.

Multi-Task Language Model Distillation

According to some embodiments, systems and methods implement a framework or approach employing knowledge distillation of a language model under a multi-task learning (MTL) setting. In some examples, the systems and methods can be used with or implemented in neural network and deep learning models, for example, for performing one or more natural language processing (NLP) tasks. Multi-task learning is based on the idea that tasks are related by means of a common low dimensional representation.

In some embodiments, the student model is distilled from different tasks jointly. There are various of reasons for doing so: first, the distilled model learns a more universal language representation by leveraging cross-task data. Second, the student model achieves both comparable quality and fast inference speed across multiple tasks. Third, the proposed framework is quite general, where the architecture of student model is independent of the teacher model.

In view of at least the above reasons, systems and methods of the present disclosure apply multi-task learning in knowledge distillation. Multiple task objectives serve as a form of regularization, discouraging the student model from overfitting to a specific task.

Language Model Pre-Training

Pre-trained language models can learn highly effective general language representations from largescale unlabeled data. Pre-trained language models can be employed or used for a variety of natural language processing (NLP) tasks, such as natural language inference, sentiment classification, and semantic textual similarity. Given a sequence of tokens, a pre-trained language model encodes each token as a general language representational embedding.

Various methods and systems for pre-training of a language model have been developed. These include pre-trained word representations, which presume singular word meanings, and thus adapt poorly to multiple contexts, such as the examples of word2vec, GloVe, and FastText. For more flexible word representations, some methods and systems learn multiple embeddings per word type. Others, such as context2vec, use bidirectional LSTM to encode contexts around target words. CoVe trains LSTM encoders on some machine translation datasets and show that these encoders can be well transferred to other tasks. ELMo learns deep word representations using a bidirectional language model; it can be added to an existing model and boosts performance across a variety of (challenging) NLP tasks.

More recently, systems and methods have employed fine-tuning approaches. They pretrain the language model on a large-scale unlabeled corpus and then fine-tune it with in-domain labeled data for a supervised downstream task. BERT, Generative Pre-trained Transformer (GPT) and GPT2 are some examples. Following BERT, XLNet proposes a generalized autoregressive pretraining method and RoBERTa optimizes BERT pretraining approach. These pretrained models are large in size and contain millions parameters.

According to some embodiments, to address this problem, the systems and methods of the present disclosure target or modify a pre-trained language model (such as the BERT model or other transformer model natural language understanding (NLU) neural network), reducing its size and/or parameters through knowledge distillation. The approach or framework of the present disclosure can be readily applied to other models as well.

Knowledge Distillation

Knowledge distillation transfers knowledge from a large teacher model to a smaller student model. In some embodiments, because the distillation only matches the output distribution, the student model architecture can be completely different from that of the teacher model. While there have been previous efforts to distill a language model into a smaller model, such distillation methods are performed on a single task, specifically designed for a transformer-based teacher architecture and, as such, cannot be readily generalized to other types of language models. Embodiments of the present disclosure provide a general distillation framework or architecture that is applicable to either transformer-based models or other models as well. In some embodiments, the framework or architecture of the present disclosure extracts more knowledge from a teacher language model (e.g., BERT) through multitask learning, while keeping the student model simple.

Multi-Task Learning

For knowledge distillation, multiple task objectives serve as a form of regularization, discouraging the student model from overfitting to a specific task. Multi-task learning (MTL) is based on the idea that tasks are related by means of a common low dimensional representation. In some embodiments of the present disclosure, MTL helps the pre-trained language models learn more generalized text representation by sharing the domain specific information contained in each related task training signal. Also provided herein is an intuitive explanation on why using shared structure could help by assuming some connections over the conditional distribution of different tasks.

Framework or Architecture for Teacher and Student Models

According to some embodiments, the present disclosure provides systems and methods implementing a framework or architecture for knowledge distillation of a language model under a multi-task learning setting. The architecture includes a teacher model and a student model. The teacher model is pretrained, and its knowledge is transferred to the smaller student model. In some embodiments, knowledge is distilled to the student model from different tasks jointly. In some examples, this framework or architecture enables or provides: that the distilled model should learn a more universal language representation by leveraging cross-task data; that the student model is maintained as a simple neural network while providing both comparable performance and fast inference speed; a general knowledge distillation framework where the architecture of the student model is independent of the teacher model.

Multi-Task Refined Teacher Model

Figure 2:
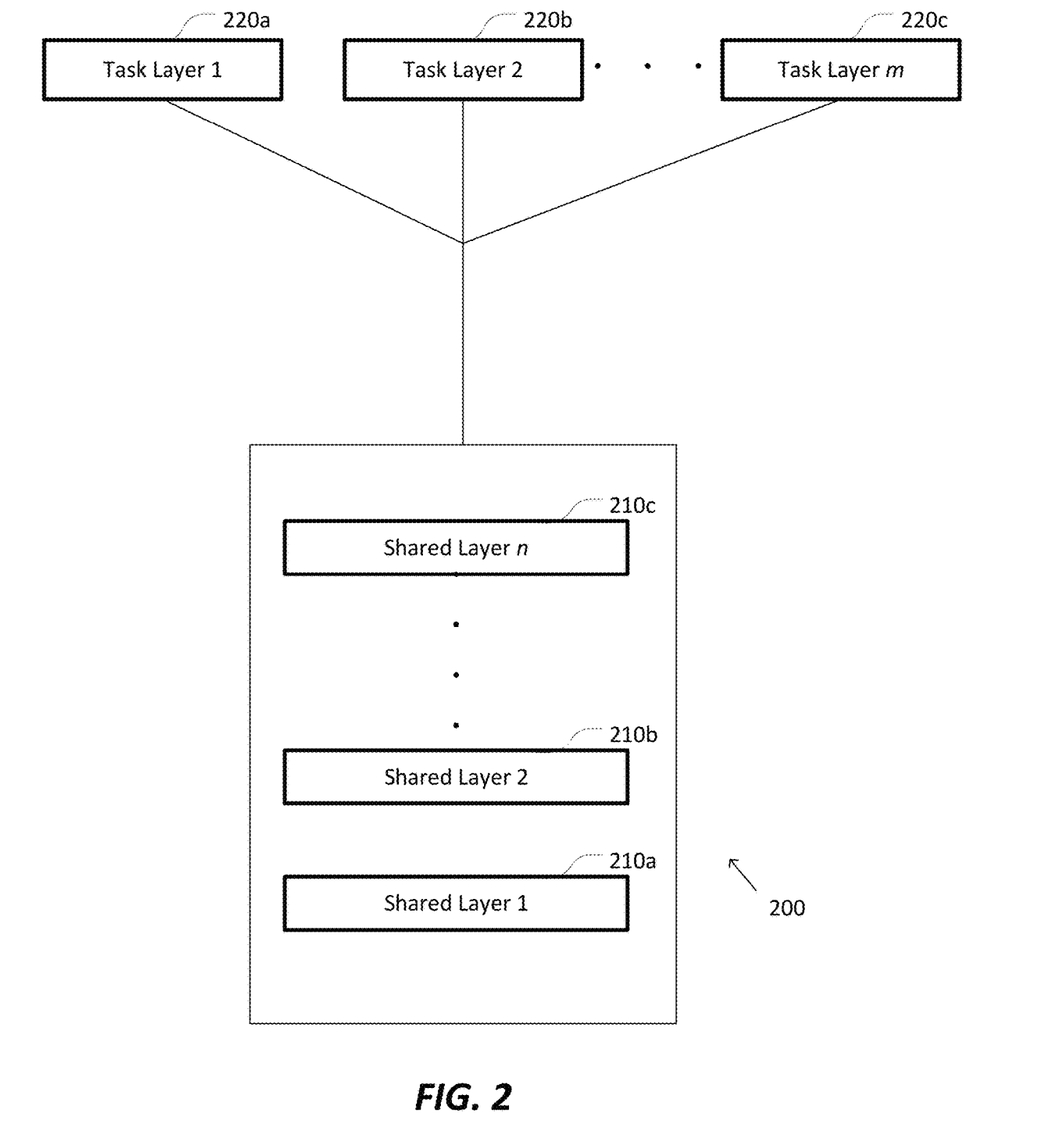
FIG. 2 is a simplified diagram of a teacher model according to some embodiments.

FIG. 2 is a simplified diagram of a teacher model 200 according to some embodiments. In some embodiments, teacher model 200 implements a neural network model for natural language processing (NLP). In some embodiments, aspects of teacher model 200 can be implemented by teacher module 130 of computing device 100.

Multitask-learning can leverage the regularization of different natural language understanding (NLU) tasks. Under this setting, language models can be more effective in learning universal language representations. As such, in some embodiments, the teacher model 200 can be implemented with one or more shared encoding layers 210a, 210b, 210c (shared layer 1, shared layer 2, . . . shared layer n) and various task specific layers 220a, 220b, 220c (task layer 1, task layer 2, . . . task layer m). In some examples, a bidirectional transformer language model (BERT) is used to implement the bottom shared, text encoding layers 210a-c of the teacher model 200. In some examples, respective task-specific top layers 220a-c of the teacher model 200 are fine-tuned for each of the multiple types of NLU tasks.

Figure 3:
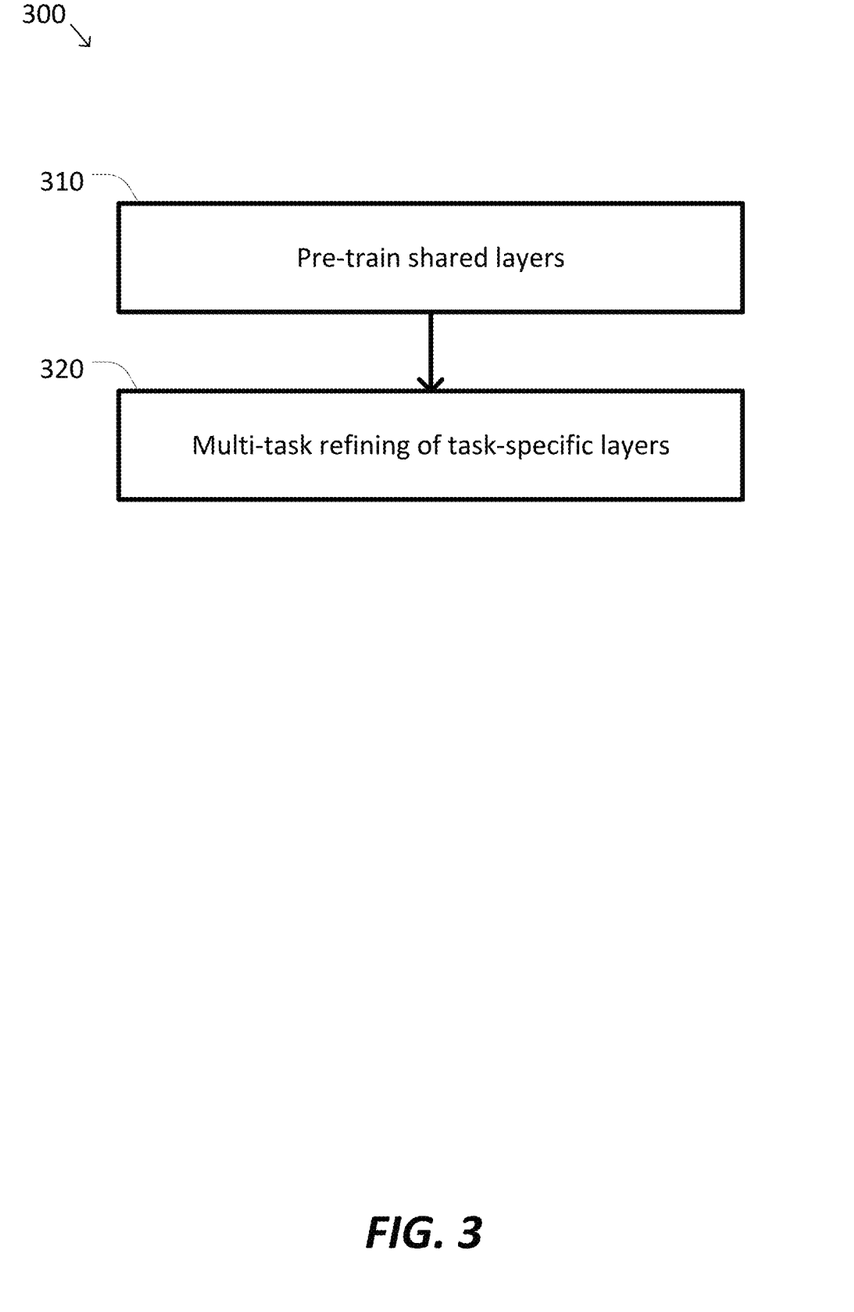
FIG. 3 is a simplified diagram of a method for training a teacher model according to some embodiments.

FIG. 3 is a simplified diagram of a method 300 corresponding to the training procedure for the teacher model 200 according to some embodiments. In some embodiments, the training procedure for the teacher model 200 includes two stages or processes: pre-training the shared layers, and multi-task refining of the multi-task layers.

Pre-training the Shared Layers: At a process 310, the shared layers 210a-c of the teacher model 200 are pre-trained. In some embodiments, a number of text sequences are input (e.g., as input data 150) to the teacher model 200 for training. These text sequences may be included in one or more datasets, such as General Language Understanding Evaluation (GLUE) benchmark, sentiment dataset SST-2, paraphrase identification datasets QQP and MRPC, text similarity dataset STS-B, and natural language inference datasets MNLI, QNLI, and RTE. Each text sequence comprises one or more words which correspond or relate to tokens. In some embodiments, each input token is first encoded as the summation of its corresponding token embeddings, segmentation embeddings and position embeddings. The input embeddings are then mapped into contextual embeddings C through a multi-layer bidirectional transformer encoder. In some embodiments, the pretraining of these shared layers 210a-c of the teacher model 200 use masked language modeling task, doze task, and/or next sentence prediction task. In some embodiments, the pre-trained $BERT_{LARGE}$ is used to initialize these shared layers 210a-c.

Multi-task Refining: At a process 320, multi-task refining is performed on the multi-task layers 220a-c of the teacher model 200. In some embodiments, the contextual embeddings C are passed from the bottom shared layers 210a-c of the teacher model 200 to the upper task-specific layers 220a-c. In some embodiments, each task-specific layer 220a, 220b, 220c of the teacher model 200 performs or implements a different, respective natural language understanding (NLU) task. In some embodiments, training NLU tasks can be classified into four categories: single sentence classification (e.g., CoLA, SST-2), pairwise text classification (e.g., RTE, MNLI, WNLI, QQP, MRPC), pairwise text similarity (e.g., STS-B), and relevance ranking (e.g., QNLI). Each category for NLU training task corresponds to its own output task-specific layer 220a-c. Implementation details for some embodiments are demonstrated using the text similarity task as an example.

Consider the contextual embedding of the special [CLS] token as the semantic representation of the input sentence pair $(X_1, X_2)$. The similarity score can be predicted by the similarity ranking layer:

$$Sim(X_1, X_2) = W_{STS}^T(1)$$

where $W_{STS}$ is a task-specific learnable weight vector, x is the contextual embedding of the [CLS] token.

In the multi-task refining stage, all the parameters of the teacher model 200, including bottom shared layers 210a-c and top task-specific layers 220a-c, are updated through mini-batch based stochastic gradient descent. One epoch is when an entire dataset is passed both forward and backward through the neural network model only once. Because one epoch may be too big to feed to the computing device at once, it is divided into several smaller batches. Thus, the training data are separated or packed into mini-batches, where each mini-batch only contains samples from one NLU task. In some embodiments, several epochs are used because passing the entire dataset through a neural network only once may not be sufficient for training. Running all the mini-batches in each epoch approximately optimizes the sum of all multi-task objectives. In each epoch, the teacher model 200 is updated according to the selected mini-batch and its task-specific objective. Still using the text similarity task as an example, each pair of sentences $(X_1, X_2)$ is labeled with a real-value similarity score y. The mean squared error loss is used as objective function:

$$\|y - Sim(X_1, X_2)\|_2^2 \quad (2)$$

For the text classification task, the cross-entropy loss is used as the objective function. For relevance ranking tasks, the negative log likelihood of the positive examples is minimized. Other tasks can be readily added by adding their own respect task-specific layer.

Biattentive Student Neural Network Model

After the teacher model 200 has been pre-trained, knowledge distillation is used to transfer knowledge from the large teacher model 200 to a smaller student model. The framework or approach is model agnostic, i.e., the choice or architecture of student model does not depend on the teacher model architecture. The teacher model can be readily switched to other language models besides BERT.

Figure 4:
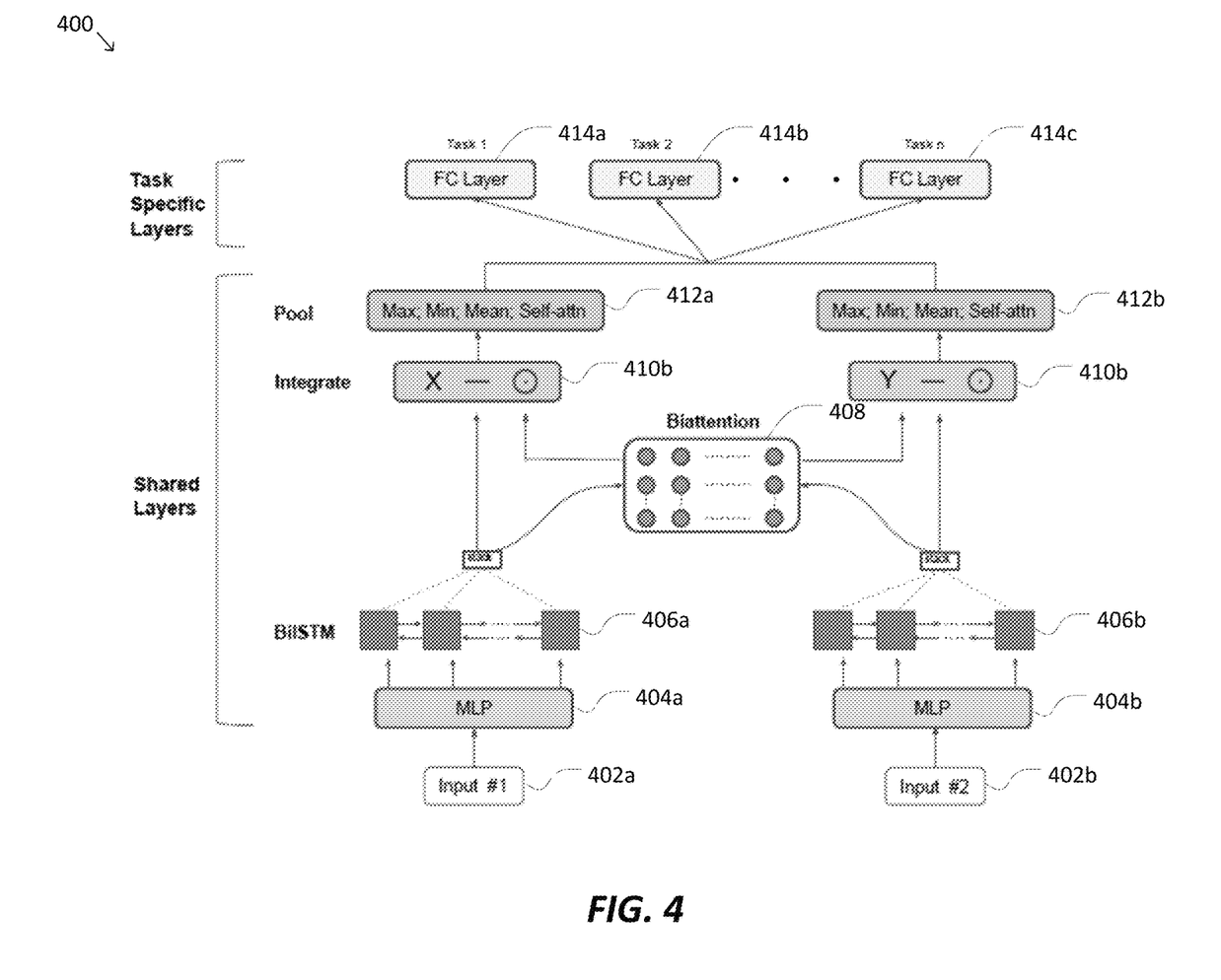
FIG. 4 is a simplified diagram of a student model according to some embodiments.
Figure 5:
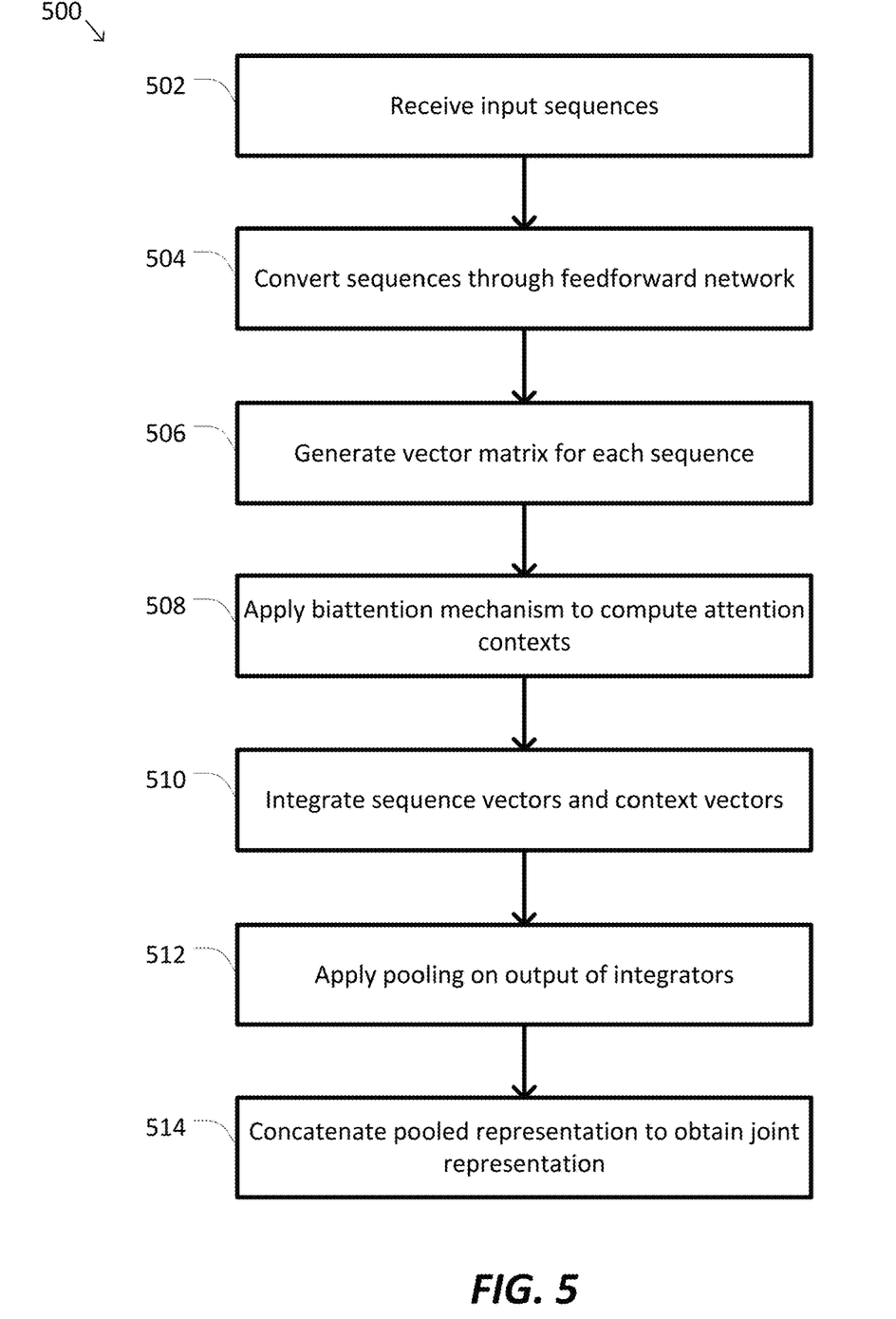
FIG. 5 is a simplified diagram of a method for running the student model according to some embodiments.

FIG. 4 is a simplified diagram of a student model 400 according to some embodiments. In some embodiments, as shown, student model 400 includes a plurality of shared bottom layers and a plurality of task specific top layers. In some embodiments, student model 400 is adapted from the biattentive classification network (BCN) (details of which are described in McCann et al., "Learned in translation: Contextualized word vectors," *In Advances in Neural Information Processing Systems*, pages 6294-6305 (2017), the entirety of which is incorporated by reference). In some embodiments, aspects of student model 400 can be implemented by student module 140 of computing device 100. FIG. 5 is a simplified diagram of a method 500 for running the student model 400 according to some embodiments.

With reference to FIGS. 4 and 5, at a process 502, student model 400 receives text sequences 402a, 402b as input (Input #1, Input #2). For equation representations, the embedding vectors of text input sequences 402a, 402b are denoted as $w^x$ and $w^y$. For single sentence input tasks, $w^y$ is the same as $w^x$.

At a process 504, the text sequences $w^x$ and $w^y$ are converted into $\hat{w}^x$ and $\hat{w}^y$ through a feedforward network. In some embodiments, student model 400 includes one or more multilayer perceptrons (MLPs) 404a, 404b. An MLP consists of at least three layers of nodes: an input layer, a hidden layer and an output layer. In some embodiments, each MLP 404a, 404b can be implemented with a rectifier linear unit (ReLU). The ReLUs implement or execute a function $f$ that applies a feedforward network with ReLU activation (as described in further detail in Nair et al., "Rectified linear units improve restricted Boltzmann machines," *Proceedings of the 27th International Conference on Machine Learning*, 2010, which is incorporated by reference herein).

At a process 506, student model 400 generates a vector matrix for each sequence. In some embodiments, for each token in $\hat{w}^x$ and $\hat{w}^y$, a bi-directional LSTM (BiLSTM) encoder 406a, 406b is used to compute its hidden states and stack them over time axis to form matrices X and Y separately.

$$x = BiLSTM(\hat{w}^x) \quad y = BiLSTM(\hat{w}^y) \quad (3)$$

$$X = [x_1; x_2; \ldots; x_n]$$

$$Y = [y_1; y_2; \ldots; y_m] \quad (4)$$

At a process 508, student model 400 applies a biattention mechanism 408 (as described in more detail in Xiong et al., "Dynamic coattention networks for question answering," arXiv preprint arXiv:1611.01604 (2016), Seo et al., "Bidirectional attention flow for machine comprehension," arXiv preprint arXiv:1611.01603 (2016), both of which are incorporated by reference herein) to compute the attention contexts $A = XY^T$ of the input sequences. The attention weights $A_x$ and $A_y$ are extracted through a column-wise normalization for each sequence. The context vectors $C_x$ and $C_y$ for each token are computed as the multiplication of its corresponding representation and attention weight:

$$A_x = \text{softmax}(A) \quad A_y = \text{softmax}(A^T) \quad (5)$$

$$C_x = A_x^T X \quad C_y = A_y^T Y \quad (6)$$

At a process 510, integrators 410a, 410b of the student model 400 integrate the sequence vectors and context vectors. In some embodiments, this is accomplished by concatenating ⊕ three different computations between original representations and context vector to reinforce their relationships. The concatenation vectors are then passed through one single-layer Bi-LSTM:

$$X_y = \text{BiLSTM}([X \oplus X - C_y \oplus X \odot C_y])$$

$$Y_x = \text{BiLSTM}([Y \oplus Y - C_x \oplus Y \odot C_x]) \quad (7)$$

That is, in some embodiments, each integrator 410a, 410b can include or be implemented with a one-layer Bi-LSTM. The Bi-LSTMs operate on the concatenation of the original representations (to ensure no information is lost in conditioning), their differences from the context vectors ($C_x$ and $C_y$, to explicitly capture the difference from the original signals), and the element-wise products between originals and context summaries (to amplify or dampen the original signals).

At a process 512, pooling mechanisms 412a, 412b of student model 400 apply pooling on the output of the integrators 410a, 410b (e.g., Bi-LSTM). In some embodiments, max, mean, and self-attentive pooling are used to extract features. The self-attentive pooling $x_{self}$ and $y_{self}$ are weighted summations of each sequence:

$$a_x = \text{softmax}(X_y v_1 + d_1)$$

$$a_y = \text{softmax}(Y_x v_2 + d_2) \quad (8)$$

$$x_{self} = X_y^T a_x, y_{self} = Y_x^T a_y \quad (9)$$

At a process 514, the max, min, mean, and self-attentive pooled representations are concatenated to generate one context representation. This context representation is fed through a fully-connected layer to obtain the final output for the shared layers of biattentive student model 400. The output of the student model 400 are hidden representations of the input sequences $w^x$ and $w^y$. Its parameters are shared across all tasks in the task-specific layers 414a, 414b, 414c of the student model 400.

Multi-Task Distillation

Figure 6:
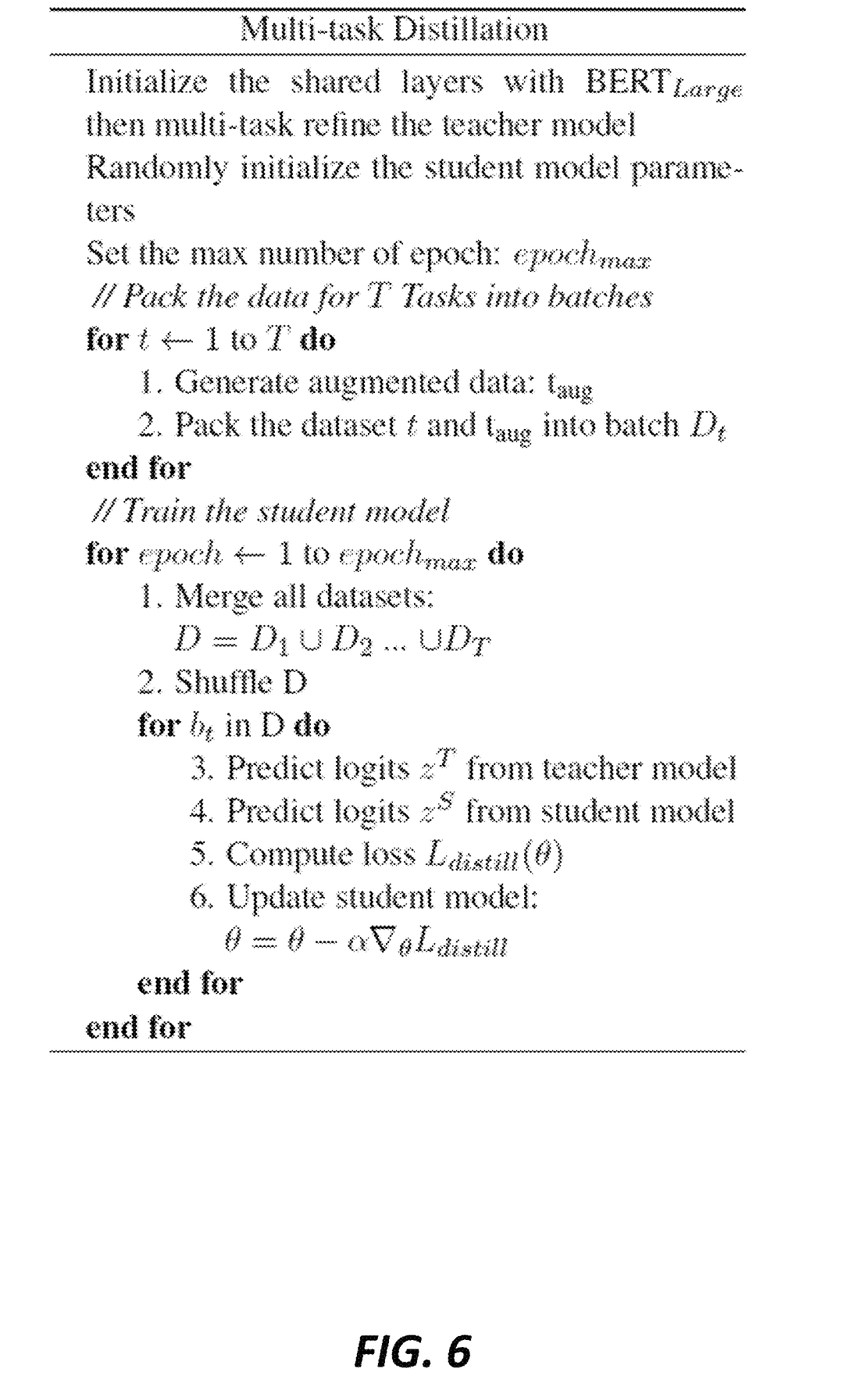
FIG. 6 is a simplified diagram of a method for multi-task distillation according to some embodiments.

The procedure or method for multi-task distillation from teacher model 200 to student model 400, according to some embodiments, is summarized in the method 600, shown in FIG. 6.

In the method, the shared layers of the teacher model 200 are initialized, and then the teacher model 200 is multi-task refined. In some embodiments, the released MT-DNN model is used to initialize the teacher model 200. In some embodiments, during training, the teacher model 200 first uses pre-trained BERT model (e.g., with $\text{BERT}_{LARGE}$) to initialize the parameters of its shared-layers. The teacher model 200 then follows the multi-task refining procedure described above to update both the bottom shared-layers 210a-c and upper task-specific layers 220a-c. In some embodiments, the teacher model 200 is refined against the multi-task learning objective for 1 epoch with learning rate set to 5e-4.

The parameters of the student model 400 are randomly initialized. In some embodiments, for the student model 400, the shared parameters of the biattentive network are randomly initialized.

Training of the student model 400 is performed over a number of epochs. One epoch is when an entire dataset is passed both forward and backward through the neural network model only once. Because one epoch may be too big to feed to the computing device at once, the training dataset is divided into several smaller batches b. The maximum number of epochs for training is set as $\text{epoch}_{max}$.

Each top task-specific layer of the model (teacher model 200 or student model 400) performs or implements a different, respective natural language understanding (NLU) task. Referring to FIG. 6, T number of tasks t may be performed by the top task-specific layers. The data for the T tasks are into packed into batches. In some embodiments, the training samples are selected from each dataset and packed into task-specific batches. For task t, the current selected batch is denoted as $b_t$. For each task t, augmented data $t_{aug}$ is generated, and the task t and augmented data $t_{aug}$ are packed into a batch dataset $D_t$.

Larger amounts of data are desirable for the teacher model to fully express its knowledge. According to some embodiments, data augmentation is used to create more training data. Various methods or techniques for text data augmentation include masking and POS-guided word replacement, as described in more detail in Tang et al., "Distilling task-specific knowledge from BERT into simple neural networks," arXiv preprint arXiv:1903.12136 (2019), which is incorporated by reference. The masking technique randomly replaces a word in the sentence with [MASK]. In some embodiments, for each word in a sentence, masking is performed with probability $p_{mask}=0.1$. In some embodiments, no other modifications are performed on this word with remaining probabilities. For sentence pair datasets, either only one sentence is modified, or both of them are modified.

For multi-task distillation, training of the student model 400 is performed over epochs 1 to $\text{epoch}_{max}$. For each epoch, all of the batch datasets $D_t$ are merged into one dataset D: $D=D_1 \cup D_2 \ldots \cup D_T$. The combined dataset D is shuffled.

In some embodiments, for multi-task distillation, the Adam optimizer (as described in more detail in Kingma et al., "Adam: A method for stochastic optimization," arXiv preprint arXiv:1412.6980 (2014), which is incorporated by reference) with learning rates of 5e-4 is used. The batch size is set to 128, and the maximum epoch is 16. The gradient norm is clipped within 1 to avoid gradient exploding. The number of BiLSTM hidden units in student model 400 are all set to 256. The output feature size of task-specific linear layers 414a-c is 512. The multi-task distilled student model 400 may be fine-tuned on each task. The learning rate is chosen from $\{1, 1.5, 5\} \times 10^{-5}$ according to the validation set loss on each task.

During multi-task training, the parameters from both bottom biattentive student network and upper task-specific layers are updated together. In some embodiments, for each task t performed by a top task-specific layer of a model, the hidden representations from the shared layers of the model are first fed to a fully connected layer with rectified linear units (ReLU), whose outputs are then passed to another linear transformation to obtain or generate raw prediction vectors or log probability values, referred to as logits, z=Wh.

The logits z are provided as input to a softmax function. Considering one text classification problem, denoted as task t, a softmax layer will perform the following operations on the $i^{th}$ dimension of z to obtain or generate the predicted probability for the $i^{th}$ class:

$$\text{softmax}(z_i^t) = \frac{\exp\{z_i^t\}}{\sum_j \exp\{z_j^t\}} \quad (10)$$

Training the student network model 400 on logits z can make learning easier. During training of the student model, for each batch $b_t$, the teacher model 200 first predicts teacher logits $z^T$. The student model 400 then updates both its bottom shared layer and the upper task-specific layers according to the teacher logits. The student model 400 generates or predicts logits $z^S$.

The teacher model's logits $z^T$ provide more information about the internal model behavior than its predicted one-hot labels. As such, there might be some loss of information from transferring logits into probability space. The multi-task distillation method computes such loss $L_{distill}(\theta)$. In some embodiments, the distillation objective is to minimize the mean squared error (MSE) between the student network logits $z_S^t$ against the teacher's logits $z_T^t$:

$$L_{distill}^t = \|z_T^t - z_S^t\|_2^2 \tag{11}$$

For each epoch, the model running through all the batches $b_t$ equals or corresponds to attending over all the tasks t:

$$L_{distill} = L_{distill}^1 + L_{distill}^2 + \ldots + L_{distill}^t \tag{12}$$

For each batch $b_t$, the parameters of the student model are updated:

$$\theta = \theta - \alpha \nabla_\theta L_{distill}$$

In some embodiments, aspects of framework or architecture, including the teacher model 200 and the student model 400, can be implemented by teacher module 130 and student module 140 of computing device 100. Some examples of computing devices, such as computing device 100 may include non-transitory, tangible, machine readable media that include executable code that when run by one or more processors (e.g., processor 110) may cause the one or more processors to perform the processes of methods 300 and 500. Some common forms of machine readable media that may include the processes of methods 300 and 500 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Analysis or Explanation of Framework or Architecture

An analysis or intuitive explanation is provided on why using some shared structure during the multitask training could yield better results. Suppose the samples of the task T are independent and identically distributed $x^T$, $y^T \sim P_{XY}^T$, where $x^T$, $y^T$ are the feature and labels of the samples in task T respectively. The joint density can be decomposed as $p^T(x,y) = p^T(x)p^T(y|x)$. During the discriminative learning process, one tries to estimate the conditional distribution $p^T(\cdot|x)$. For different tasks, $p^T(\cdot|X)$ could be very different. Indeed, if there are no connections in $p^T(\cdot|X)$ for different tasks, then training on one task may not be helpful for another. However, if some smoothness over $p^T(\cdot|X)$ is assumed, then some connections can be built across tasks.

Without loss of generality, the case of two tasks $T_1$ and $T_2$ is investigated. For tasks $T_1$ and $T_2$, it is assumed there exist some common domain of representations H, and two functions: $h^{T_1}(x)$, $h^{T_2}(x): X \mapsto H$, such that $$p^{T_1}(\cdot|x) = g^{T_1} \circ h^{T_1}(x), \tag{13}$$

$$p^{T_2}(\cdot|x) = g^{T_2} \circ h^{T_2}(x), \tag{14}$$

$$\forall x_1, x_2, \|h^{T_1}(x_1) - h^{T_2}(x_2)\| \leq \eta \|x_1 - x_2\|, \tag{15}$$

where $g^T: H \mapsto Y^T$ is a function that maps from the common domain H to the task labels $Y^T$ for task T, $\circ$ denotes the function composition, and $\eta$ is a smoothness constant.

The Lipschitz-ish inequality of (15) suggests the hidden representation $h^{T_1}$ on task $T_1$ may help the estimation of hidden representation $h^{T_2}$ on task $T_2$, since $h^{T_2}(x_2)$ will be close to $h^{T_1}(x_1)$ if $x_1$ and $x_2$ are close enough. This is implicitly captured if one common network is used to model both $h^{T_1}$ and $h^{T_2}$ since the neural network with ReLU activation is Lipschitz.

Results

Experiments were conducted on various datasets, including seven widely used datasets in General Language Understanding Evaluation (GLUE) benchmark, one sentiment dataset SST-2, two paraphrase identification datasets QQP and MRPC, one text similarity dataset STS-B, and three natural language inference datasets MNLI, QNLI, and RTE.

In some examples and experiments, the released MT-DNN model is used as the teacher model 200. The teacher model 200 is initialized with PyTorch implemented $BERT_{LARGE}$. The model is further refined against the multi-task learning objective for 1 epoch with learning rate set to 5E-4. The student model 400 is initialized randomly. For multi-task distillation, the Adam optimizer is used with learning rates of 5E-4. The batch size is set to 128, and the maximum epoch is 16. The gradient norm is clipped within 1 to avoid gradient exploding. The number of BiLSTM hidden units in student model are all set to 256. The output feature size of task-specific linear layers is 512. The multi-task distilled student model is fine-tuned on each task. For both teacher and student models, WordPiece embeddings with a 30522 token vocabulary are used. For student model multitask training, the embeddings remain static. For fine-tuning stage, the embeddings are updated for only MRPC and RTE datasets.

Results on the systems and methods employing or implementing the multi-task language model distillation framework or architecture of the present disclosure, which may be referred to a $BNN_{MTL}$, are presented. BNN refers to $BNN_{MTL}$ that has been fine-tuned on each dataset.

The table of FIG. 7A shows results for $BNN_{MTL}$ and BNN from the GLUE test server, evaluated on a version of the QNLI dataset. These results are compared against the results from other methods or approaches, for example, $BERT_{LARGE}$, $BERT_{BASE}$, ALBERT, $ALBERT_{1.5M}$, $ALBERT_{ensembles}$, TinyBERT, BERT-PKD, Distilled BiLSTM, $BERT_{EXTREME}$, OpenAI GPT, ELMo, MT-DNN, $MT-DNN_{Teacher}$. The table of FIG. 7A shows that the multi-task language model distillation framework or architecture of the present disclosure ($BNN_{MTL}$ and BNN) has better or comparable performance compared with ELMo and OpenAI GPT. Among all the distillation models of the same parameter numbers magnitude, BNN has comparable performance with the least number of parameters. It is expected that the performance of the model of the present disclosure will be further improved by adding more layers to strengthen its representation capacity. The results in the table of FIG. 7A demonstrates that the model of the present disclosure performs better than Distilled BiLSTM and achieves an improvement range of 2:2~6:1 points across six datasets.

FIG. 7B shows a table with results for ablation studies on the dev set of different training procedures. Line 1 to Line 5 are for models all trained with the original dataset, without using augmentation data. Line 1 is the base model trained without knowledge distillation (KD). Line 2 is distilled from single task. Line 3 is the Multi-task distilled model. Line 4 is the Multi-task distilled model using word-level tokenizer. Line 5 is the Multi-task distilled BiLSTM. Line 6 is the Multi-task distilled model with augmentation data. Both Line 5 and Line 6 are not fine-tuned.

Figure 7C:
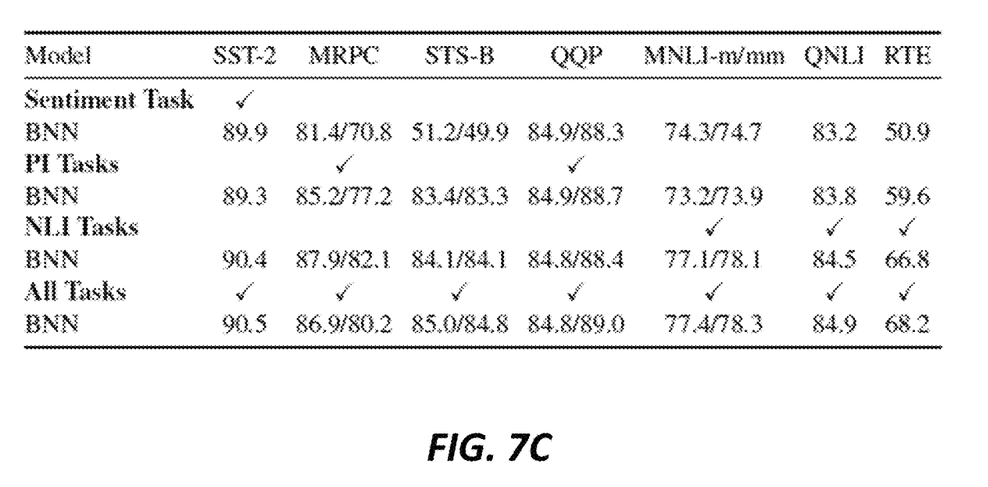

FIG. 7C shows a table with results for ablation experiments on the dev set using different training tasks in multi-task distillation by the model of the present disclosure. The results are reported with original corpus, without augmentation data. The model is fine-tuned on each individual task. The training set incorporates tasks of the same type individually. Even for the tasks which are in the training sets, they still perform better in the all tasks training setting.

Figure 7D:
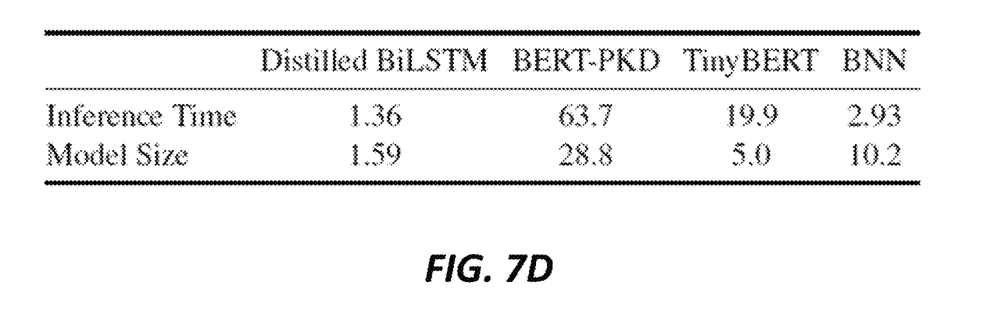

FIG. 7D shows a table with results for the inference time (in seconds) and number of parameters (in millions) for example baseline models (Distilled BiLSTM, BERT-PKD, TinyBERT) and the multi-task distillation model of the present disclosure. The model size does not include embedding layers. As shown, the multi-task distillation model significantly outperforms Distilled BiLSTM.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for transfer of knowledge from a teacher model to a student model, the method comprising:
   initializing one or more shared layers of the teacher model;
   refining multiple task layers of the teacher model, each task layer capable of performing a respective task;
   randomly initializing parameters of the student model;
   separating training data corresponding to multiple tasks that the teacher model has been refined for into a plurality of batches, wherein each batch is specific to at least one task from the multiple tasks;
   for each task-specific batch:
      predicting logits from the teacher model based on training inputs in the task-specific batch;
      predicting logits from the student model based on training inputs in the task-specific batch; and
      computing a task-specific distillation loss based on a difference between the logits from the teacher model and the logits from the student model; and
   computing an aggregated distillation loss by summing task-specific distillation losses corresponding to the multiple tasks; and
   jointly updating the student model based on the aggregated distillation loss.

2. The method of claim 1, wherein the tasks comprise at least one natural language processing task.

3. The method of claim 1, wherein the tasks comprise at least one of a natural language inference task, a single sentence classification task, a sentiment classification task, a semantic text similarity task, and a relevance ranking task.

4. The method of claim 1, wherein at least one of the student model and the teacher model comprises a language representational model.

5. The method of claim 1, wherein at least one of the student model and the teacher model comprises a transformer model natural language understanding neural network.

6. The method of claim 1, wherein the student model comprises one or more shared layers and a plurality of task layers.

7. The method of claim 1, wherein updating the student model comprises minimizing a mean squared error between logits predicted by the student model against the predicted logits from the teacher model.

8. A system for transfer of knowledge from a teacher model to a student model, the system comprising:
   a memory storing machine executable code; and
   one or more processors coupled to the memory and configurable to execute the machine executable code to cause the one or more processors to:
      initialize one or more shared layers of the teacher model;
      refine multiple task layers of the teacher model, each task layer capable of performing a respective task;
      randomly initialize parameters of the student model;
      separate training data corresponding to multiple tasks that the teacher model has been refined for into a plurality of batches, wherein each batch is specific to at least one task from the multiple tasks;
      for each task-specific batch:
         predict logits from the teacher model based on training inputs in the task-specific batch;
         predict logits from the student model based on training inputs in the task-specific batch; and
         compute a task-specific distillation loss based on a difference between the logits from the teacher model and the logits from the student model; and
      compute an aggregated distillation loss by summing task-specific distillation losses corresponding to the multiple tasks; and
      jointly update the student model based on the aggregated distillation loss.

9. The system of claim 8, wherein the tasks comprise at least one natural language processing task.

10. The system of claim 8, wherein the tasks comprise at least one of a natural language inference task, a single sentence classification task, a sentiment classification task, a semantic text similarity task, and a relevance ranking task.

11. The system of claim 8, wherein at least one of the student model and the teacher model comprises a language representational model.

12. The system of claim 8, wherein at least one of the student model and the teacher model comprises a transformer model natural language understanding neural network.

13. The system of claim 8, wherein the student model comprises one or more shared layers and a plurality of task layers.

14. The system of claim 8, wherein updating the student model comprises minimizing a mean squared error between logits predicted by the student model against the predicted logits from the teacher model.

15. A non-transitory machine-readable medium comprising executable code which when executed by one or more processors associated with a computer are adapted to cause the one or more processors to perform a method for transfer of knowledge from a teacher model to a student model comprising:
- initializing one or more shared layers of the teacher model;
- refining multiple task layers of the teacher model, each task layer capable of performing a respective task;
- randomly initializing parameters of the student model;
- separating training data corresponding to multiple tasks that the teacher model has been refined for into a plurality of batches, wherein each batch is specific to at least one task from the multiple tasks;
- for each task-specific batch:
  - predicting logits from the teacher model based on training inputs in the task-specific batch;
  - predicting logits from the student model based on training inputs in the task-specific batch; and
  - computing a task-specific distillation loss based on a difference between the logits from the teacher model and the logits from the student model; and
- computing an aggregated distillation loss by summing task-specific distillation losses corresponding to the multiple tasks; and
- jointly updating the student model based on the aggregated distillation loss.

16. The non-transitory machine-readable medium of claim 15, wherein the tasks comprise at least one natural language processing task.

17. The non-transitory machine-readable medium of claim 15, wherein the tasks comprise at least one of a natural language inference task, a single sentence classification task, a sentiment classification task, a semantic text similarity task, and a relevance ranking task.

18. The non-transitory machine-readable medium of claim 15, wherein at least one of the student model and the teacher model comprises a language representational model.

19. The non-transitory machine-readable medium of claim 15, wherein at least one of the student model and the teacher model comprises a transformer model natural language understanding neural network.

20. The non-transitory machine-readable medium of claim 15, wherein the student model comprises one or more shared layers and a plurality of task layers.

21. The non-transitory machine-readable medium of claim 15, wherein updating the student model comprises minimizing a mean squared error between logits predicted by the student model against the predicted logits from the teacher model.

* * * * *